US008441139B2

(12) United States Patent
Karimi

(10) Patent No.: US 8,441,139 B2
(45) Date of Patent: May 14, 2013

(54) APPARATUS FOR CONVERTING WAVE, SOLAR AND WIND ENERGY

(76) Inventor: Reza Karimi, Varamin (IR)

( * ) Notice: Subject to any disclaimer, the term of this patent is extended or adjusted under 35 U.S.C. 154(b) by 372 days.

(21) Appl. No.: 12/901,532

(22) Filed: Oct. 10, 2010

(65) Prior Publication Data

US 2012/0086206 A1    Apr. 12, 2012

(51) Int. Cl.
*F03B 13/10* (2006.01)
*F03B 13/12* (2006.01)
*H02P 9/04* (2006.01)
*F03D 9/00* (2006.01)

(52) U.S. Cl.
USPC ............................... 290/53; 290/44

(58) Field of Classification Search ............ 290/44, 290/53
See application file for complete search history.

(56) References Cited

U.S. PATENT DOCUMENTS

| | | | | |
|---|---|---|---|---|
| 1,018,678 A * | 2/1912 | Nelson | ......................... | 290/4 D |
| 3,965,365 A * | 6/1976 | Parr | ......................... | 290/53 |
| 4,159,427 A * | 6/1979 | Wiedemann | ......................... | 290/55 |
| 4,319,454 A * | 3/1982 | Lucia | ......................... | 60/506 |
| 4,389,843 A * | 6/1983 | Lamberti | ......................... | 60/507 |
| 4,408,455 A * | 10/1983 | Montgomery | ......................... | 60/505 |
| 4,480,966 A * | 11/1984 | Smith | ......................... | 417/332 |
| 4,552,514 A * | 11/1985 | Hagen | ......................... | 417/332 |
| 4,560,884 A * | 12/1985 | Whittecar | ......................... | 290/42 |
| 4,608,497 A * | 8/1986 | Boyce | ......................... | 290/53 |
| 4,792,290 A * | 12/1988 | Berg | ......................... | 417/332 |
| 5,710,464 A * | 1/1998 | Kao et al. | ......................... | 290/53 |
| 6,016,015 A * | 1/2000 | Willard, Jr. | ......................... | 290/55 |
| 6,100,600 A * | 8/2000 | Pflanz | ......................... | 290/54 |
| 6,294,844 B1 * | 9/2001 | Lagerwey | ......................... | 290/55 |
| 6,432,302 B1 * | 8/2002 | Obritsch et al. | ......................... | 210/170.05 |
| 7,075,189 B2 * | 7/2006 | Heronemus et al. | ......................... | 290/44 |
| 7,105,940 B2 * | 9/2006 | Weesner et al. | ......................... | 290/44 |
| 7,121,536 B2 * | 10/2006 | Ruzicka et al. | ......................... | 261/91 |
| 7,453,164 B2 * | 11/2008 | Borden et al. | ......................... | 290/42 |
| 7,459,802 B2 * | 12/2008 | Loui et al. | ......................... | 290/53 |
| 7,579,704 B2 * | 8/2009 | Steenstrup et al. | ......................... | 290/53 |
| 7,598,624 B2 * | 10/2009 | Loui et al. | ......................... | 290/42 |
| 7,808,120 B2 * | 10/2010 | Smith | ......................... | 290/42 |
| 7,821,147 B2 * | 10/2010 | Du Bois | ......................... | 290/44 |
| 7,891,351 B2 * | 2/2011 | Hinderling et al. | ......................... | 126/605 |
| 7,994,649 B2 * | 8/2011 | Abatemarco | ......................... | 290/43 |
| 8,097,150 B1 * | 1/2012 | Houser et al. | ......................... | 210/136 |
| 8,264,093 B2 * | 9/2012 | Moore | ......................... | 290/42 |
| 8,299,645 B2 * | 10/2012 | Muchow et al. | ......................... | 290/55 |
| 2002/0182946 A1 * | 12/2002 | Tanaka | ......................... | 440/6 |
| 2003/0168864 A1 * | 9/2003 | Heronemus et al. | ......................... | 290/55 |
| 2008/0110168 A1 * | 5/2008 | Garcia Lopez | ......................... | 60/497 |
| 2008/0122225 A1 * | 5/2008 | Smith | ......................... | 290/42 |
| 2008/0131830 A1 * | 6/2008 | Nix | ......................... | 432/220 |

(Continued)

*Primary Examiner* — Pedro J Cuevas
(74) *Attorney, Agent, or Firm* — Barry Choobin; Patent360 LLC

(57) ABSTRACT

The various embodiments herein provide an apparatus for harnessing a wave energy, solar energy and wind energy. The apparatus comprises a floating frame, a base portion connected to the floating frame and at least two linkage units. The two linkage units are a basic linkage unit and a medium linkage unit. The apparatus includes a plurality of floating flaps and at least one power extraction means. A connecting pivot is provided in the linkage units and the base portion. The floating flaps are pivoted vertically on the basic linkage unit and the base portion. The flaps associated with the floating flaps are placed under water against prevailing waves and floats associated with the floating flaps are placed on surface of the water, for absorbing the wave energy from projected portions present at edges and middle portion of the flaps.

18 Claims, 21 Drawing Sheets

U.S. PATENT DOCUMENTS

| | | | |
|---|---|---|---|
| 2008/0157532 A1* | 7/2008 | Loui et al. | 290/53 |
| 2008/0196758 A1* | 8/2008 | McGuire | 136/245 |
| 2009/0039654 A1* | 2/2009 | Loui et al. | 290/53 |
| 2009/0309366 A1* | 12/2009 | Moore | 290/53 |
| 2010/0078942 A1* | 4/2010 | Bois | 290/54 |
| 2011/0037264 A1* | 2/2011 | Roddier et al. | 290/44 |
| 2011/0068579 A1* | 3/2011 | Dullaway | 290/53 |
| 2012/0001431 A1* | 1/2012 | Smith | 290/53 |
| 2012/0032444 A1* | 2/2012 | Burton | 290/53 |
| 2012/0292910 A1* | 11/2012 | Moore | 290/53 |

* cited by examiner

APPARATUS FOR CONVERTING WAVE, SOLAR AND WIND ENERGY

SPONSORSHIP STATEMENT

Iranian National Science Foundation sponsors current Application for international filing.

BACKGROUND

1. Technical Field

The embodiments herein generally relate to an apparatus for harnessing natural energy. The embodiments herein particularly relate to the apparatus for harnessing wave energy, solar energy and wind energy and more particularly relate to an apparatus for use in water bodies for converting a wave energy, solar energy and wind energy to a usable form for producing an electric power.

2. Description of the Related Art

Often, the importance of wave, wind and solar energy on the surface of seas and oceans has been revealed in recent years. The notion of harnessing the power of ocean waves has held mankind's attention for quite some time. As such, there have been several inventions directed towards converting kinetic energy of waves into electrical energy. Some schemes suggest mechanism such as buoyant object in vertical or free horizontal movements, linked floats in horizontal direction or flaps in vertical position for harvesting the energy. Another scheme uses linkage portions and vertical flap in forward-backward movement in effect of wave oscillations. In the first scheme the reaction force is internal and in other words either body member resists other mate body consecutively. In second scheme the reaction force is seabed.

Generally more free is the collector in the direction of the wave motion, the apparatus is more able to convert the energy of the wave and less is the resistance to the wave motions. Further, the currently available scheme lacks free movements of collector or lacks in converting all the movements of the waves into energy. For example, one of the available schemes permits the collector to be free only in a horizontal direction. Actually, the waves in ocean are irregular in real condition and in addition to the prevalent waves, some smaller waves in oblique angle often hit the collector but the apparatus connection parts and collector are not strong enough to withstand the waves thereby causing harmful effects to the apparatus. Moreover, the cost of the apparatus is high and the conversion efficiency is low. Furthermore, the bulky body of converters in the apparatus necessarily increases the cost of the apparatus.

Hence there is a need for a strong, cheaper and efficient apparatus for harnessing at least one of a wave energy, wind energy and solar energy. Also there exists a need to provide an apparatus for use in waterbodies for harnessing the energy. Further there exists a need to improve a capability of a converter in extracting the energy by absorbing the energy even from the aslant waves.

The abovementioned shortcomings, disadvantages and problems are addressed herein and which will be understood by reading and studying the following specification.

OBJECTIVES OF THE EMBODIMENTS

The primary object of the embodiments herein is to provide an apparatus for harnessing at least one of wave energy, wind energy and solar energy for production of electricity.

Another object of the embodiments herein is to provide an apparatus for use in waterbodies to improve a capability of an energy converter in extracting an energy by absorbing an energy from the waves coming aslant.

Yet another object of the embodiments herein is to provide an apparatus provided with cheap and efficient towers for installation of wind turbines for extracting wind energy.

Yet another object of the embodiments herein is to provide an apparatus with a roof for installation of photovoltaic sheets to extract solar energy.

Yet another object of the embodiments herein is to provide an apparatus for use in a waterbody to extract wind energy, solar energy and wave energy on sea and ocean using internal and external spaces of floats.

These and other objects and advantages of the embodiments herein will become readily apparent from the following detailed description taken in conjunction with the accompanying drawings.

SUMMARY

The various embodiments herein provide an apparatus for harnessing at least one of a wave energy, solar energy and wind energy. The apparatus is used in a water body such as shallow or deep water. The apparatus comprises a floating frame, a base portion connected to the floating frame, at least two linkage units provided in the apparatus, wherein the two linkage units are a basic linkage unit and a medium linkage unit. The apparatus includes a plurality of upstanding floating flaps and at least one power extraction means. A connecting pivot is provided in the linkage units and the base portion. The floating flaps are pivoted vertically on the basic linkage unit and the base portion. The flaps associated with the floating flaps are placed under water against the prevailing waves and the floats associated with the floating flaps are placed on a surface of the water, for absorbing the wave energy from projected portions present on edges and middle portion of the flaps.

According to one embodiment, the floating frame is tethered to a seabed for preventing an astray of a floating frame from the seabed. At least three wind turbine towers are provided in the floating frame for extracting the wind energy and the roofing is provided with plurality of photovoltaic sheets for extracting the solar energy. The wind turbines are built away from the roofing to decrease a shadowing effect on the photovoltaic sheets. The apparatus further comprises a plurality of cavities filled with light material and provided in the plurality of floating flaps. The Examples of the light material include but are not limited to one of air, thermocol or foam. A built in float is connected to each of the flaps, wherein the built in float is connected to the top of the flap along a horizon and the width of the flap for the built in float to keep floating on the surface of the water and move vertically during the wave motions. Further the apparatus comprises one or more elevator boxes and at least one gear box in each of the elevator box for pulling up or releasing down a mass body in the apparatus and to release a potential energy of the elevated mass body in the apparatus to a lower position.

Each of the elevator box includes at least two pulleys and at least two ropes, wherein the at least two ropes are steel ropes. A first steel rope in the at least two ropes and a first pulley in the at least two pulleys convert a pulling force of the flap to a circular motion and a second pulley in the at least two pulleys and second steel rope in the at least two ropes receive the pulling force to elevate the mass body in the apparatus. Further, each of the floating flaps is provided with a sealed linkage unit comprising a power extraction means, high pressure reservoirs, low pressure reservoirs, computers, control systems, hydro motors and generators adapted for a movement of each of the flap in at least one of a left direction, a right direction, a backward direction, a forward direction and a heave direction. A fixed element is provided in perpendicular to an axis of a pivot connecting the basic linkage unit and the base portion for transferring a reaction force associated with the base portion to the basic linkage unit.

Each of the floating flaps further comprises at least one sliding rail in each of the floating flap. The at least one sliding rail is connected to one of the bottom portion or middle portion of the flap to permit the floating flap to slide in the pivoted rail in a vertical direction and in oblique direction. A flexible object is provided along each of the sliding rail and the pivoted rail to avoid the edge of the sliding rail and the pivoted rail sinking into the water.

The apparatus further comprises a connecting means for connecting the basic linkage unit to a space out of the water, wherein the connecting means is a tube made of metal or plastic material. Also the apparatus includes a pivoted rail, a lever pivoted on the pivoted rail and a connecting lever pivoted on the sliding rail for shifting a vertical motion of the flap to a pivotal motion and wherein the connecting lever is connected to the bottom portion of the flap. Each of the basic linkage unit is pivoted on a pivoted rail along with the flap to permit each of the flaps to move in the direction perpendicular to pivotal motion of the basic linkage unit. The pivot associated with the pivoted rail is placed within the basic linkage unit to avoid sinking of the floating flap into the water.

According to one embodiment herein, the at least one power extraction means is arranged between the axis of the basic linkage unit and body of the basic linkage unit for extracting wave energy from related motion of the flap.

According to one embodiment herein, the at least one power extraction means is arranged between the pivoted rail and the body of the basic linkage unit for extracting wave energy from a related motion of the flap.

According to one embodiment herein, the at least one power extraction means is arranged between the pivoted rail and the pivoted lever of the heave motion to extract wave energy from related motion of the flap.

Each of the power extraction means further comprises at least one hydraulic ram for transferring the mechanical energy of the wave to a pressurized fluid, one or more hydro motors for converting the pressurized fluid energy into a circular mechanical motion, one or more generators for converting the circular motion of the hydro motors to generate an electrical power. Also the power extraction means include a controller device provided in each of the hydraulic ram for facilitating one end of the hydraulic cylinder ram to attain one of a locked position, a free position or to change a displacement length of the hydraulic cylinder ram to a predefined angular change.

The controller device includes double rails and at least one adjusting unit. The at least one adjusting unit further includes a shaft, at least two free wheels, and a double toothed shell. The toothed shell is sealed and filled with oil and pivoted on the double rails for avoiding a movement of the double rails in a linear direction. Also the adjusting movement controller device includes at least two ratchet lockers and a pneumatic cylinder ram actively engaged as a command actuator. Further, the command actuator is provided with a plurality of cylinder rams. The shaft gets locked within the double toothed shell for fixing one end of the power extracting means. The shaft gets locked within the double toothed shell utilizing the at least two ratchet lockers. Each of the at least two ratchet lockers locks the shaft in one direction and frees the shaft in opposite direction.

According to one embodiment herein, the apparatus includes one or more low pressure reservoirs for retaining the fluid, feed extraction means, at least three high pressure reservoirs for storing one or more of the wave energy, the solar energy and the wind energy, one or more sensors, one or more micro switches, an electronic command and monitoring unit connected to one or more sensors and the one or more micro switches. The micro switches monitor a data associated with status of the apparatus. A control unit is provided in the linkage unit equipped with one or more electrically controllable valves, one or more unidirectional valves and one or more distribution devices to establish a coordinating apparatus.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The other objects, features and advantages will occur to those skilled in the art from the following description of the preferred embodiment and the accompanying drawings in which.

Figure 1A:
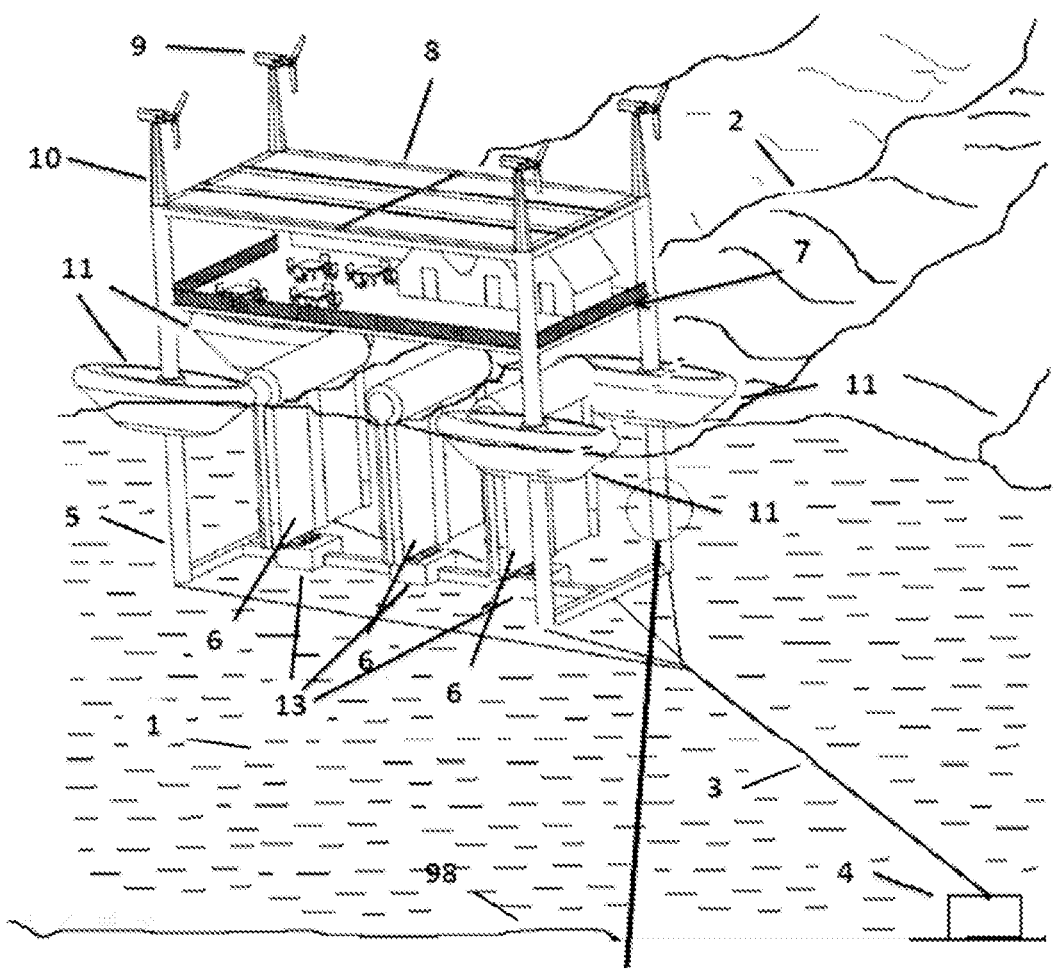
FIG. 1a illustrates a perspective of the apparatus for harnessing wave energy, wind energy and solar energy according to an embodiment herein.

Although the specific features of the present invention are shown in some drawings and not in others. This is done for convenience only as each feature may be combined with any or all of the other features in accordance with the present invention.

DETAILED DESCRIPTION OF THE EMBODIMENTS

In the following detailed description, a reference is made to the accompanying drawings that form a part hereof, and in which the specific embodiments that may be practiced is shown by way of illustration. These embodiments are described in sufficient detail to enable those skilled in the art to practice the embodiments and it is to be understood that the logical, mechanical and other changes may be made without departing from the scope of the embodiments. The following detailed description is therefore not to be taken in a limiting sense.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

The various embodiments herein provide an apparatus for harnessing at least one of a wave energy, solar energy and wind energy. The apparatus is used in a water body such as shallow or deep water. The apparatus comprises a floating frame, a base portion connected to the floating frame and at least two linkage units provided in the apparatus. The two linkage units are a basic linkage unit and a medium linkage unit. The apparatus includes a plurality of upstanding floating flaps and at least one power extraction means. A connecting pivot is provided in the linkage units and the base portion. The floating flaps are pivoted vertically on the basic linkage unit and the base portion. The flaps associated with the floating flaps are placed under water against the prevailing waves and the floats associated with the floating flaps are placed on the surface of the water, for absorbing the wave energy from projected portions present at the edges and middle portion of the flaps.

The floating frame is tethered to seabed for preventing an astray of the floating frame from the seabed. At least three wind turbine towers are provided in the floating frame for extracting the wind energy and the roofing is provided with plurality of photovoltaic sheets for extracting the solar energy. The wind turbines are built away from the roofing to reduce a shadowing effect on the photovoltaic sheets. The apparatus further comprises a plurality of cavities filled with light material and provided in the plurality of the floating flaps. The Examples of the light material include but are not limited to air, thermocol or foam. A built in float is connected to each of the flap and wherein the built in float is connected to the top of the flap along horizon and width of the flap to keep floating on the surface of the water and move vertically during the wave motions. Further the apparatus comprises one or more elevator boxes and at least one gear box in each of the elevator box for pulling up or releasing down the mass body in the apparatus and to release potential energy of the elevated mass body in the apparatus to a lower position.

Each of the elevator boxes includes at least two pulleys and at least two ropes. The at least two ropes are steel ropes. A first steel rope in the at least two ropes and a first pulley in the at least two pulleys convert a pulling force of the flap to a circular motion and a second pulley in the at least two pulleys and a second steel rope in the at least two ropes receive the pulling force to elevate the mass body in the apparatus. Further, each of the floating flaps is provided with a sealed linkage unit comprising a power extraction means, high pressure reservoirs, low pressure reservoirs, computers, control systems, hydro motors and generators adapted for movement of each of the flap in at least one of a left direction, a right direction, a backward direction, a forward direction and a heave direction. A fixed element is provided in perpendicular to an axis of a pivot connecting the basic linkage unit and the base portion for transferring a reaction force associated with the base portion to the basic linkage unit.

Each of the floating flaps further comprises at least one sliding rail in each of the floating flap. The at least one sliding rail is connected to one of the bottom portion or middle portion of the flap to permit the floating flap to slide in the pivoted rail in a vertical direction and in oblique direction. A flexible object is provided along each of the sliding rails and the pivoted rail to avoid a touching edge of the sliding rail and the pivoted rail sinking into the water.

The apparatus further comprises a connecting means for connecting the basic linkage unit to a space out of the water. The connecting means is a tube made of metal or plastic material. Also the apparatus includes a pivoted rail, a lever pivoted on the pivoted rail and a connecting lever pivoted on the sliding rail for shifting a vertical motion of the flap to a pivotal motion. The connecting lever is connected to the bottom portion of the flap. Each of the basic linkage unit is pivoted on a pivoted rail along with the flap to permit each of the flaps to move in the direction perpendicular to pivotal motion of the basic linkage unit. The pivot associated with the pivoted rail is placed within the basic linkage unit to avoid sinking of the floating flap into the water.

The at least one power extraction means is arranged between the axis of the basic linkage unit and body of the basic linkage unit or between the pivoted rail and the body of the basic linkage unit or between the between the pivoted rail and the pivoted lever of the heave motion for extracting wave energy from a relative motion of the flap. Each of the power extraction means further comprises at least one hydraulic ram for converting the mechanical energy of the wave into a pressurized fluid energy, one or more hydro motors for converting the pressurized fluid energy into a circular mechanical motion, and one or more generators for converting the circular motion of the hydro motors to generate an electrical power. Also the power extraction means includes a controller device provided in each of the hydraulic ram for facilitating one end of the hydraulic cylinder ram to attain one of a locked position, a free position or to change a displacement length of the hydraulic cylinder ram to a predefined angular change.

The controller device includes double rails and at least one adjusting unit. The at least one adjusting unit further includes a shaft, at least two free wheels, and a double toothed shell. The toothed shell is sealed and filled with oil and pivoted on the double rails for avoiding a movement of the double rails in a linear direction. Also the adjusting movement controller device includes at least two ratchet lockers and a pneumatic cylinder ram actively engaged as a command actuator. Further, the command actuator is provided with a plurality of cylinder rams. The shaft gets locked within the double toothed shell for fixing one end of the power extracting means. The shaft gets locked within the double toothed shell utilizing the at least two ratchet lockers. Each of the at least two ratchet lockers locks the shaft in one direction and releases the shaft in an opposite direction.

The apparatus further includes one or more low pressure reservoirs for retaining the fluid, feed extraction means, at least three high pressure reservoirs for storing one or more of the wave energy, the solar energy and the wind energy, one or more sensors, one or more micro switches and an electronic command and monitoring unit connected to one or more sensors and the one or more micro switches. The micro switches monitor a data associated with status of the apparatus. A control unit is provided in the linkage unit equipped with one or more electrically controllable valves, one or more unidirectional valves and one or more distribution devices to establish a coordinating apparatus.

FIG. 1a illustrates a perspective of the apparatus for harnessing at least one of a wave energy, wind energy and solar energy according to an embodiment of the present disclosure. With respect to FIG. 1, the apparatus includes a floating flap 6 which is vertically pivoted to a base portion 13. The floating flap 6 is moved in one or more of a forward direction, backward direction, left direction, right direction and in vertical direction with respect to the base portion 13, when the floating flap 6 is in contact with waves 2. The base portion 13 has a stable connection with frame 5 which is partially immersed in the sea 1. The frame 5 has three or more pillars which are connected by three or more floats 11. The floats 11 move vertically to change the immersing degree of the frame 5 to determine the maximum displacement of the flaps 6 or displace the flaps 6 out of the sea. The pillars of frame 5 are extended over the sea as a base for providing the towers 10 to the wind turbines 9. The pillars are roofed over. The roof 7 has a deck and the roof 7 is covered with photovoltaic cells 8 to convert solar energy into electrical energy. The floating frame 5 is tethered to the sea bed 98 with a steel rope 3 and an anchored mass 4.

Figure 1B:
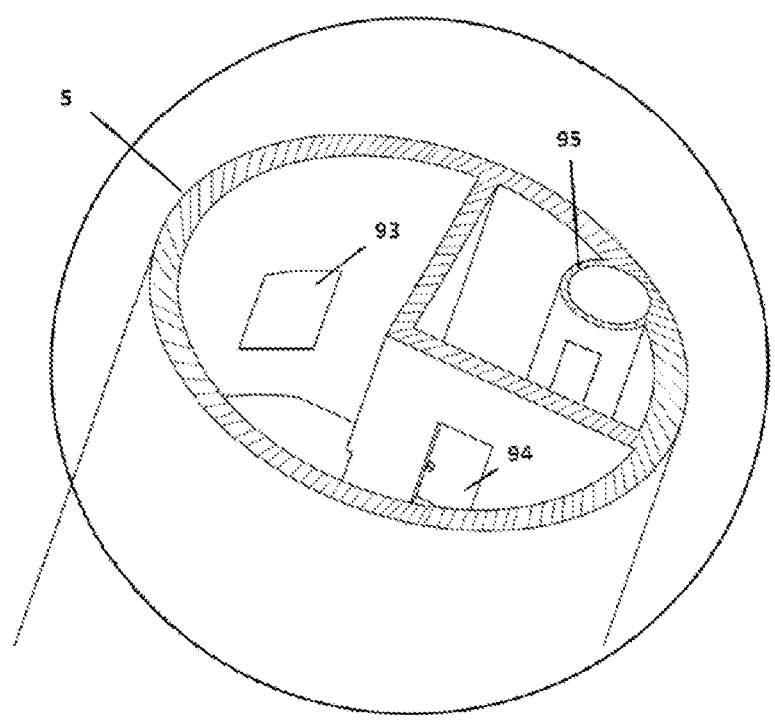
FIG. 1b illustrates an enlarged view of the encircled portion of FIG. 1 according to an embodiment herein.

FIG. 1b illustrates an enlarged view of encircled portion as shown in FIG. 1a according to an embodiment of the present disclosure. With respect to the FIG. 1b, the frame 5 has one or more pillars and constructions which are chambered. Further the chambers are filled with air to make the chamber lighter to help the floats 11 to keep frame 5 on the surface of water 1. The chambers are designed as immersed residence suits with a porthole 93, a door 94 and an elevator 95 as a part of residence site.

Figure 2A:
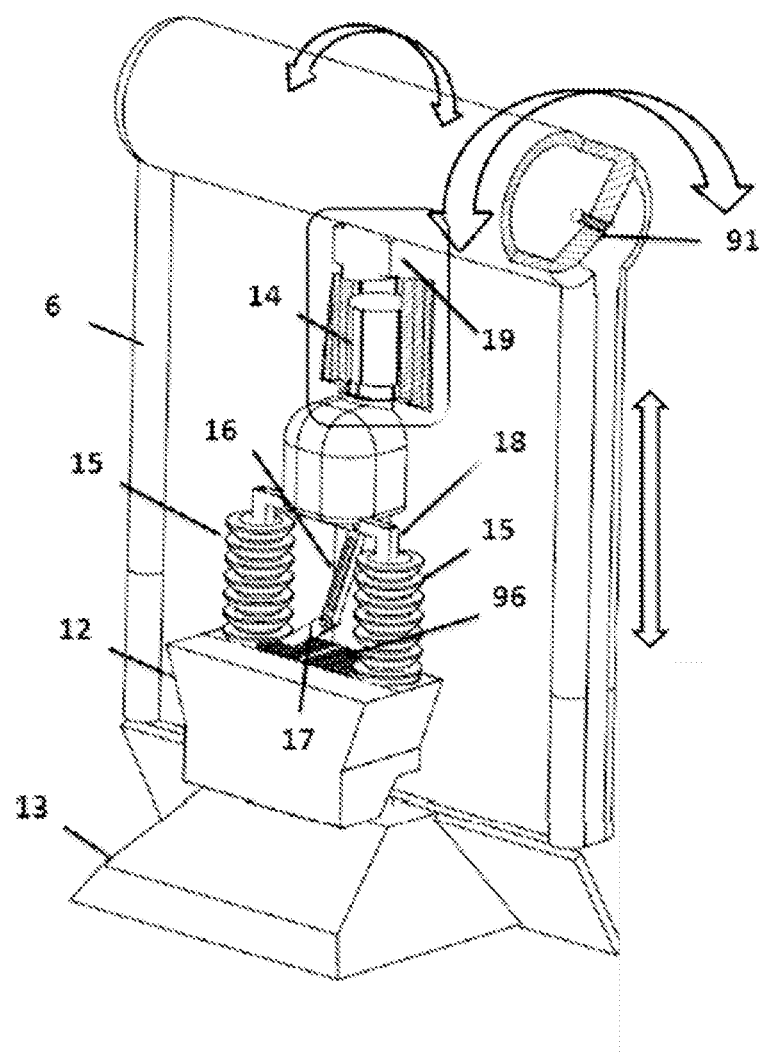
FIG. 2a illustrates a back side view of the apparatus for harnessing wave energy, wind energy and solar energy according to an embodiment herein.
Figure 5A:
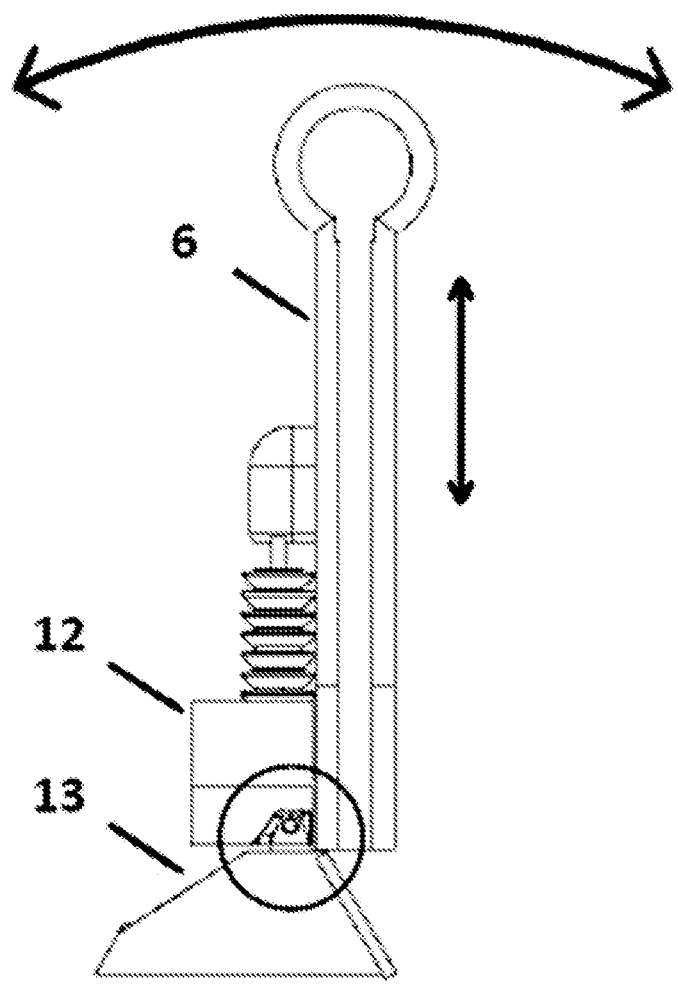
FIG. 5a illustrates a side view of the floating flap, linkage units and base portion in an apparatus for harnessing wave energy, wind energy and solar energy according to an embodiment herein.
Figure 5C:
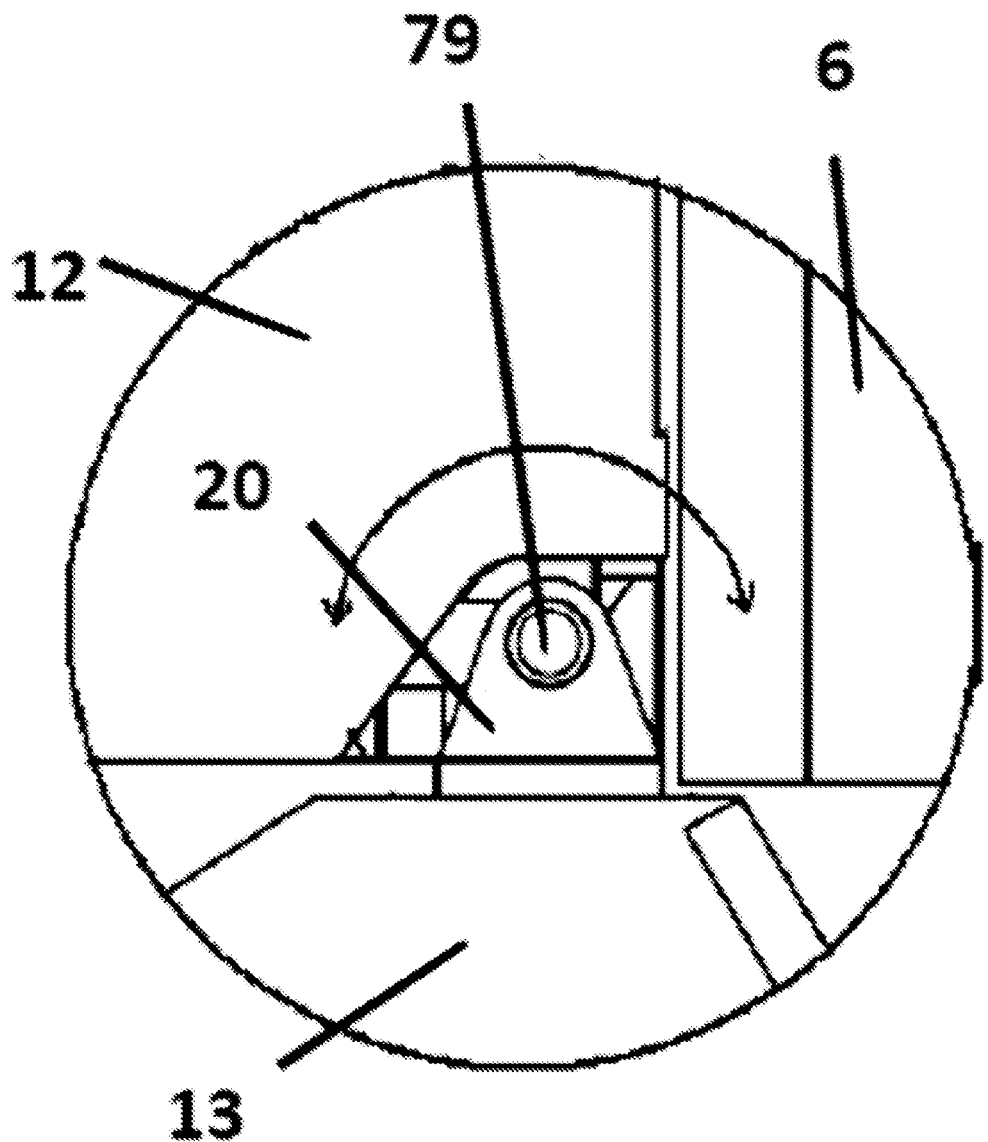
FIG. 5c illustrates an enlarged view of encircled portion as shown in FIG. 5a according to an embodiment herein.
Figure 5D:
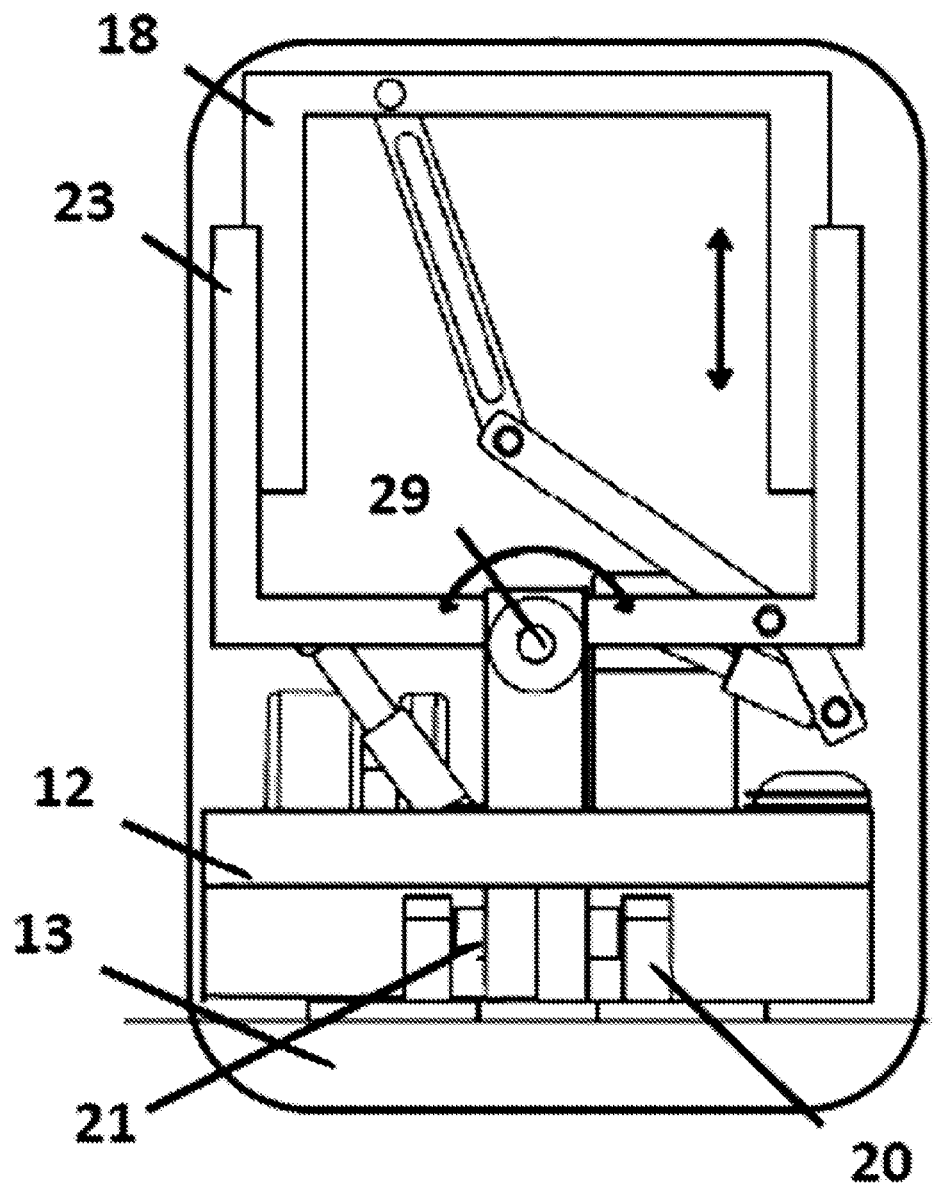
FIG. 5d illustrates a detailed view of rectangular portion as shown in FIG. 5b according to an embodiment herein.
Figure 6A:
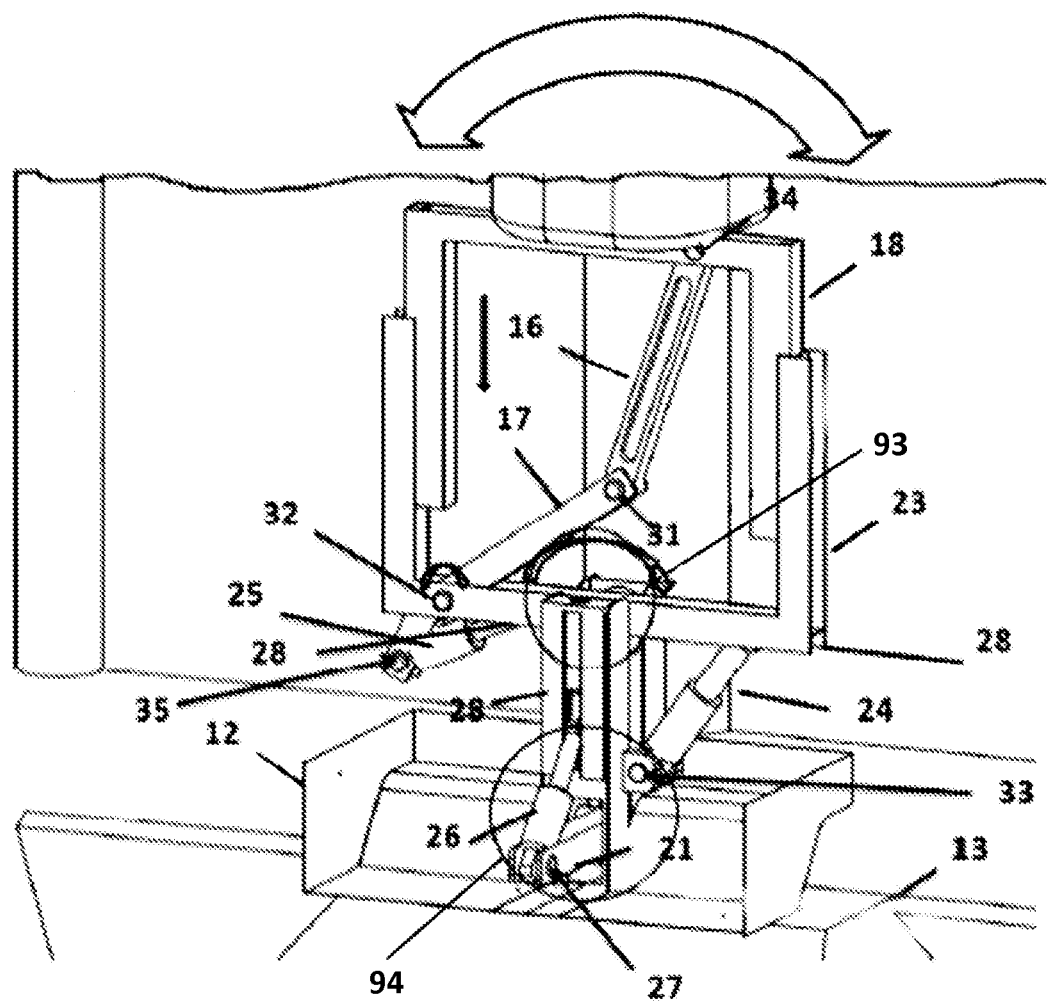
FIG. 6a illustrates a back view of the power extraction means and linkage units in an apparatus for harnessing wave energy, wind energy and solar energy according to an embodiment herein.
Figure 6B:
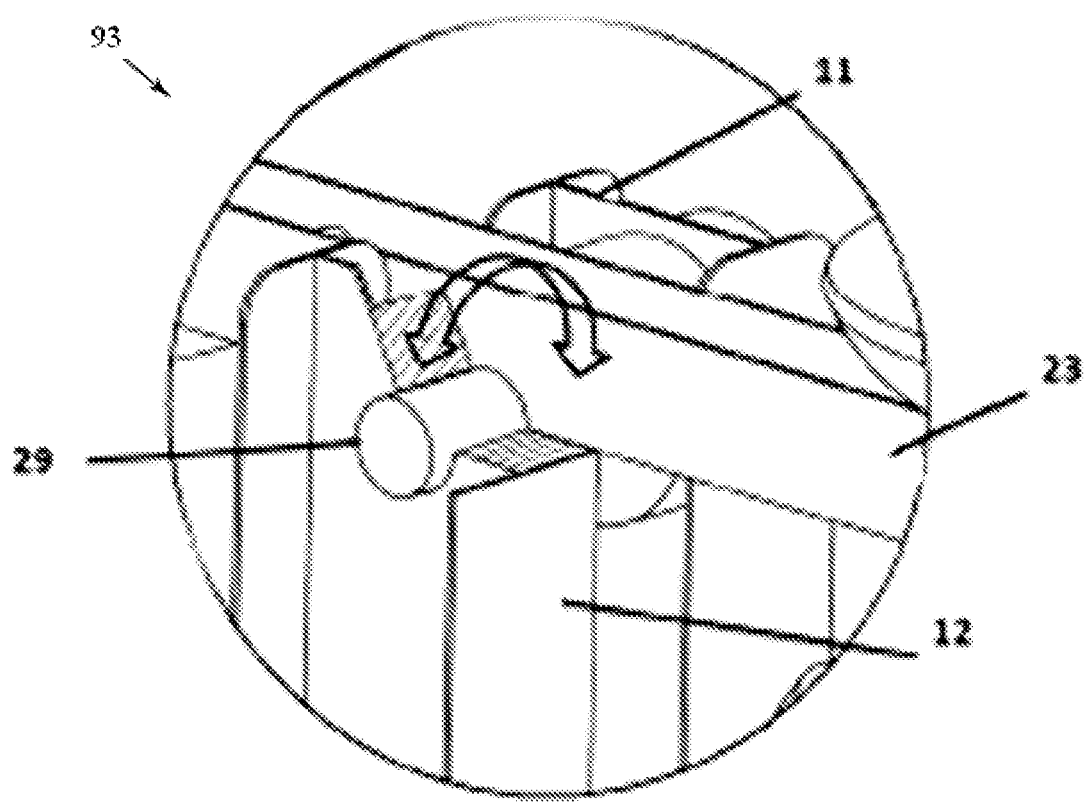
FIG. 6b illustrates an enlarged view of encircled portion marked 93 in FIG. 6a according to an embodiment of the present disclosure.

FIG. 2a illustrates back view of the apparatus for harnessing at least one of a wave energy, wind energy and solar energy according to an embodiment of the present disclosure. With respect to FIG. 2a, the base portion 13 is anchored to the sea bed. A floating flap 6 has built in floats to keep the floating flaps 6 floating on the sea surface. The floating flap 6 comprises cavities filled with air or other light material to make the flaps lighter and adapted to the maximum frequency of target waves. The floating flap comprises built in floats with fixed connection to flap located in top position along horizon and width of flap to keep it floating on the surface of the water and make it move vertically due to the wave motions. The buoyant and chambers (as shown in FIG. 1b) are filled with water with controllable valve to immerse the flap entirely when there is an increase in the height of the water waves or in hostile situations or change in natural period of flap portion. The floating flap 6 has fixed connection with a sliding rail 18 which moves vertically tangent and parallel to pivoted rail 23 (as shown in FIG. 6a). The tangent rails are covered and sealed with a flexible object 15 to prevent the water getting into the apparatus. A basic linkage unit 12 is pivoted to the bottom portion of base portion 13 (as shown in FIG. 5a and FIG. 5c) to permit the flap to move in a forward and backward direction. A linkage unit 12 is also pivoted to pivoted rail 23 within the apparatus (as shown in FIG. 6a and FIG. 5d). A mass 14 moves perpendicularly to confirm oscillation natural period of the floating flap 6 with respect to dominant incident waves. The more the mass 14 in upper position and farther it is from the pivot 79 (as shown in FIG. 5c) and pivot 29 (as shown in FIG. 6b), the more the increase in the natural period of the floating flap 6 and vice versa.

Figure 2B:
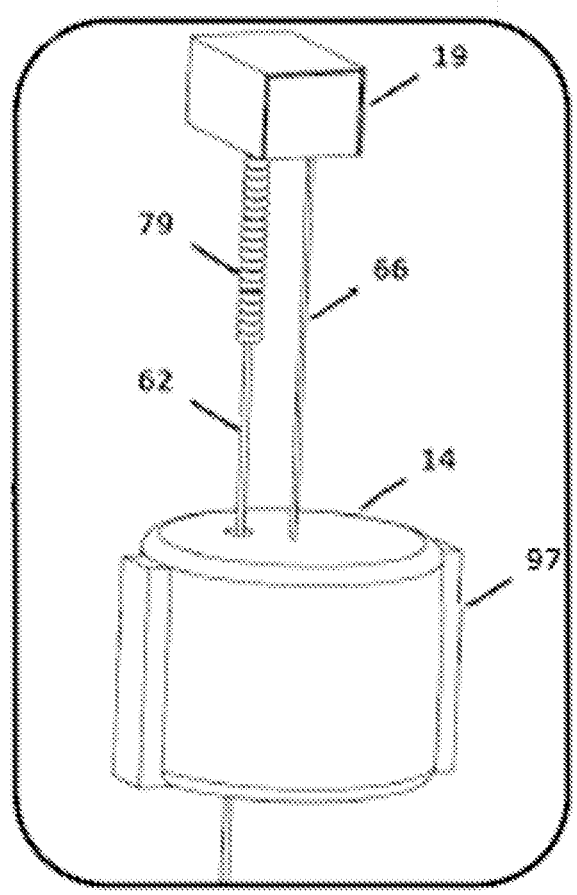
FIG. 2b illustrates an enlarged view of the rectangular portion of FIG. 2a according to an embodiment herein.
Figure 7:
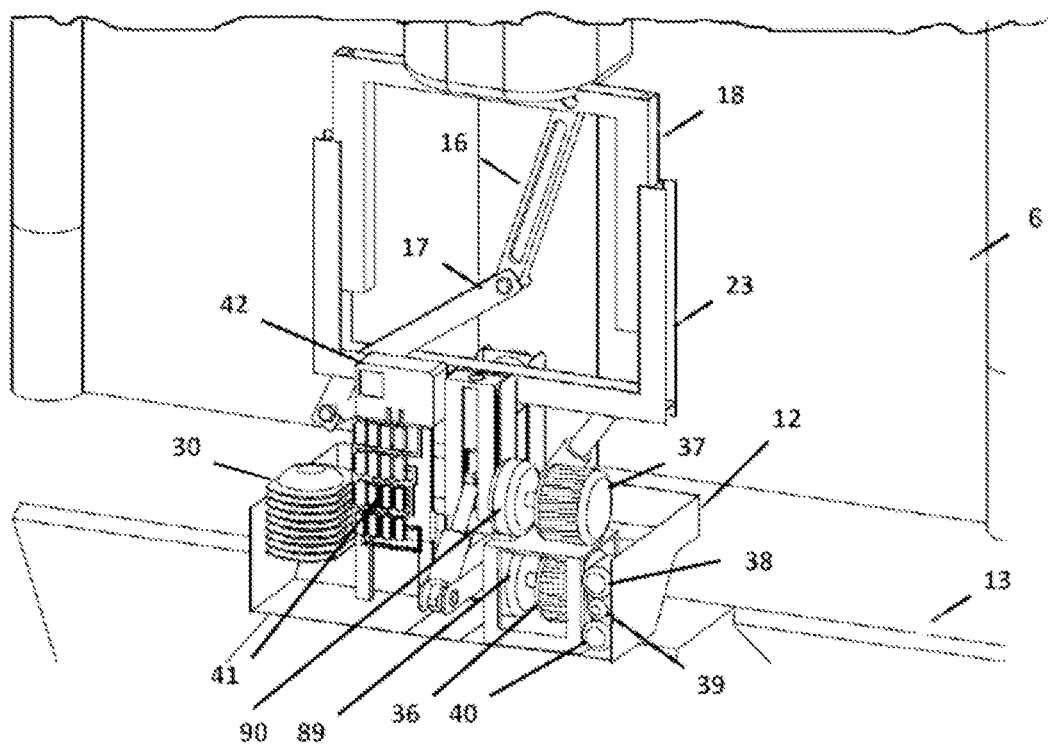
FIG. 7 illustrates a partial cutaway view of the basic linkage unit in an apparatus for harnessing wave energy, wind energy and solar energy according to an embodiment herein.

FIG. 2b illustrates a detailed view of rectangular portion as shown in FIG. 2a according to an embodiment of the present disclosure. With respect to FIG. 2a, a steel rope 62 is connected to pivoted rail 23 (as shown in FIG. 6a) and is covered with a flexible expansion object 79 at an entrance position to the elevator box 19. The elevator box 19 changes a short displacement pull motion of the floating flap 6 to a long displacement motion of a rope 66. The rope 66 is connected to mass 14, in order to put the mass 14 in an upper position. The elevator box 19 receives a command from the computer control unit 42 (as shown in FIG. 7) to release the mass 14 and drag it down to a lower position.

Figure 3:
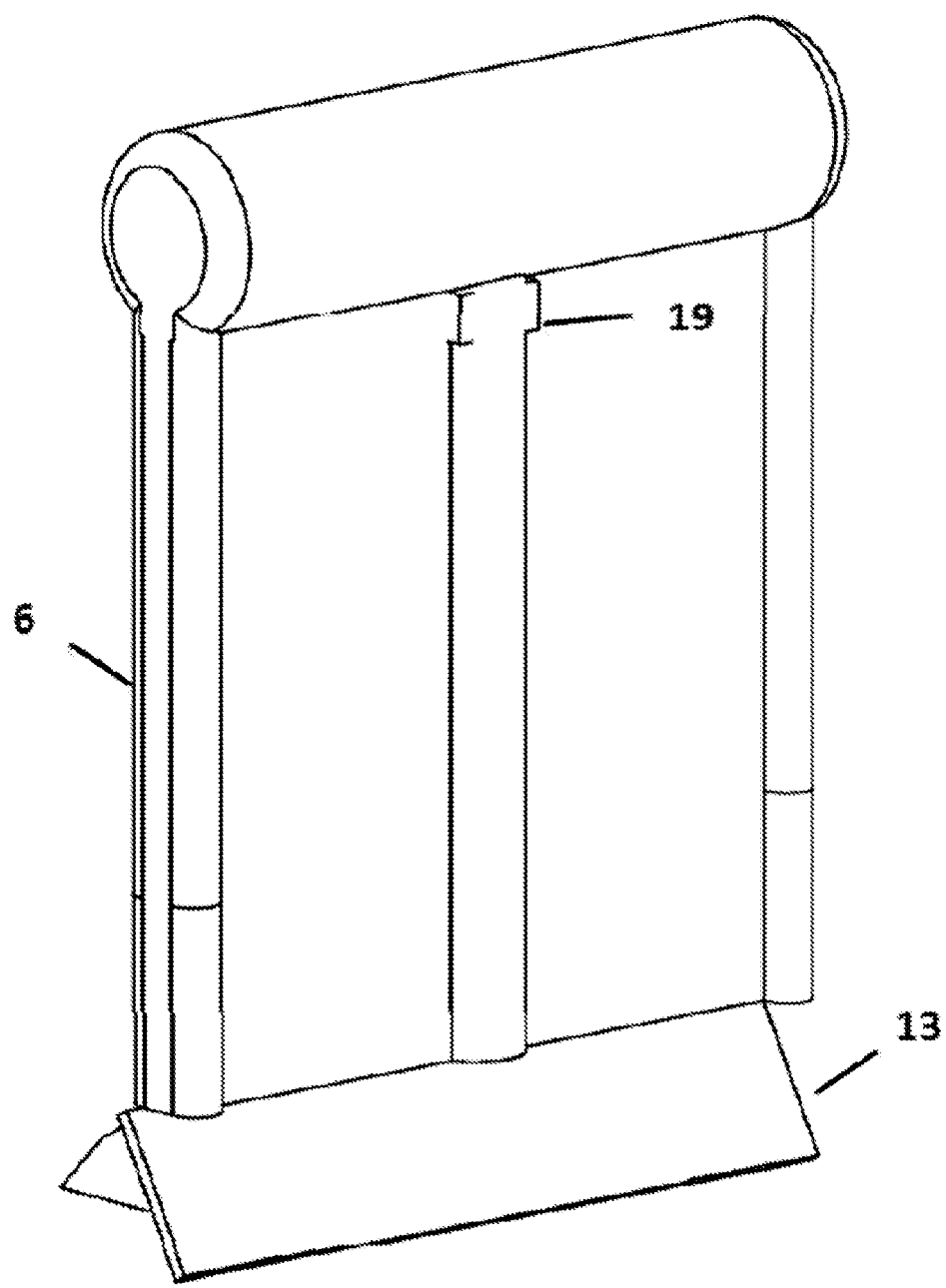
FIG. 3 illustrates a front view of the floating flap and base portion in an apparatus for harnessing wave energy, wind energy and solar energy according to an embodiment herein.

FIG. 3 illustrates a front view of a floating flap and a base portion according to an embodiment of the present disclosure. With respect to FIG. 3, a base portion 13 has a deflector panel in front of the flap to prevent a reduction in the efficiency of the apparatus due to a distance formed between the base portion 13 and the floating flap 6. The deflector helps in leading an energy extracted through the waves towards the floating flap 6.

Figure 4:
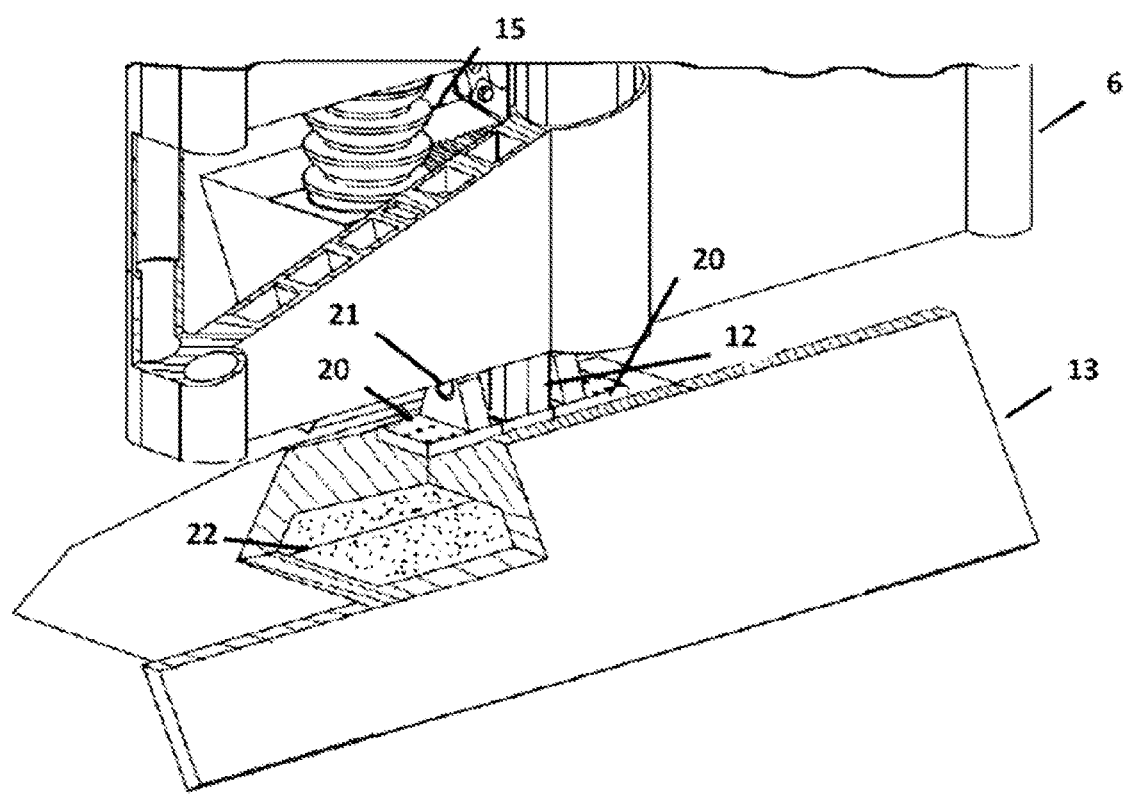
FIG. 4 illustrates a front view of the floating flap and the base portion and a sectional view of the flap in an apparatus for harnessing wave energy, wind energy and solar energy according to an embodiment herein.

FIG. 4 illustrates a front view of a floating flap and the base portion and a sectional view of the flap according to an embodiment of the present disclosure. With respect to the FIG. 4, a base portion 13 is made out of a concrete material to act as a void chamber. Further the base portion 13 is transferred to an installation place and filled with a heavy material such as sand. The filling up of the base portion with the sand reduces the cost of the apparatus. The floating flap 6 is made buoyant confirming with shortest normal wave period at the installation place.

Figure 5B:
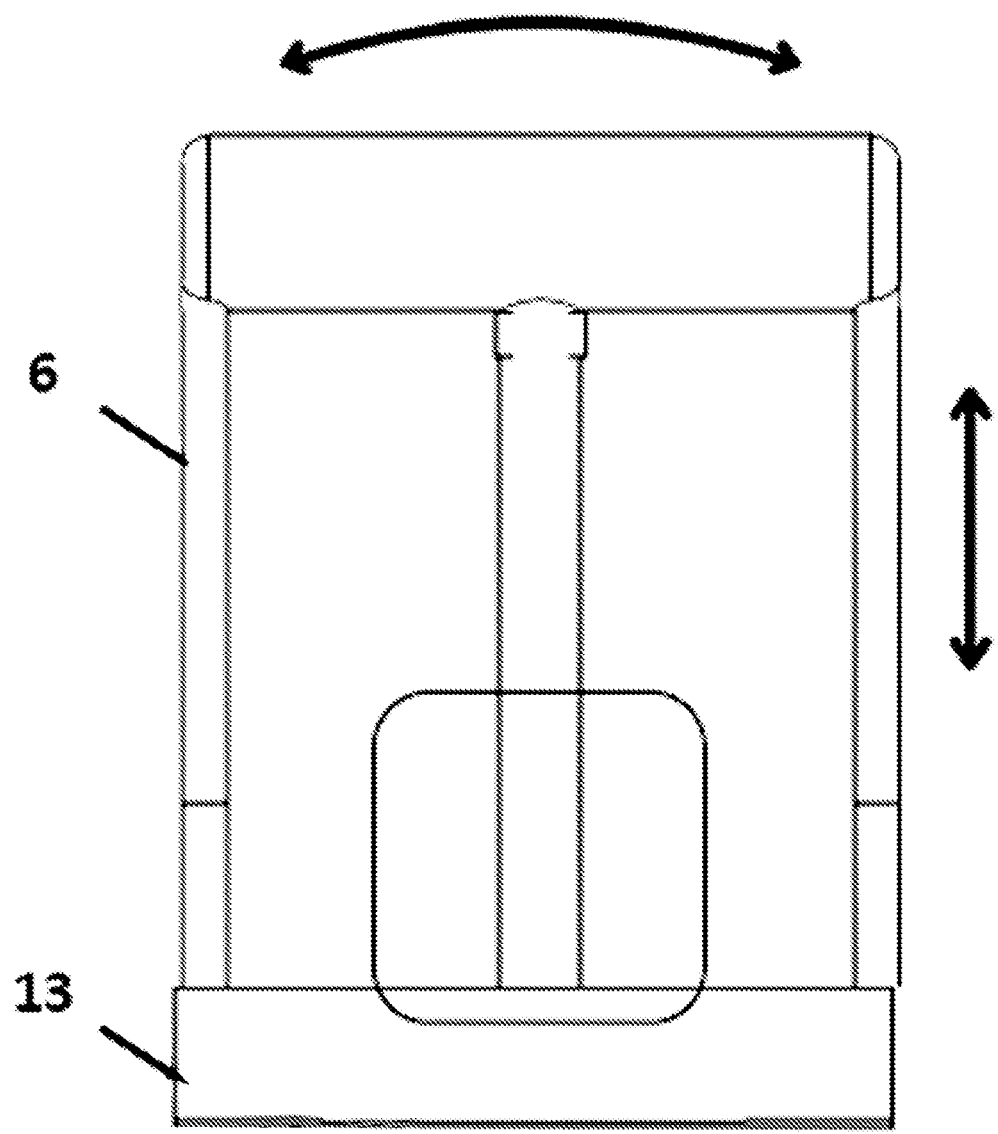
FIG. 5b illustrates a front view of the floating flap apparatus for harnessing wave energy, wind energy and solar energy according to an embodiment herein.
Figure 12:
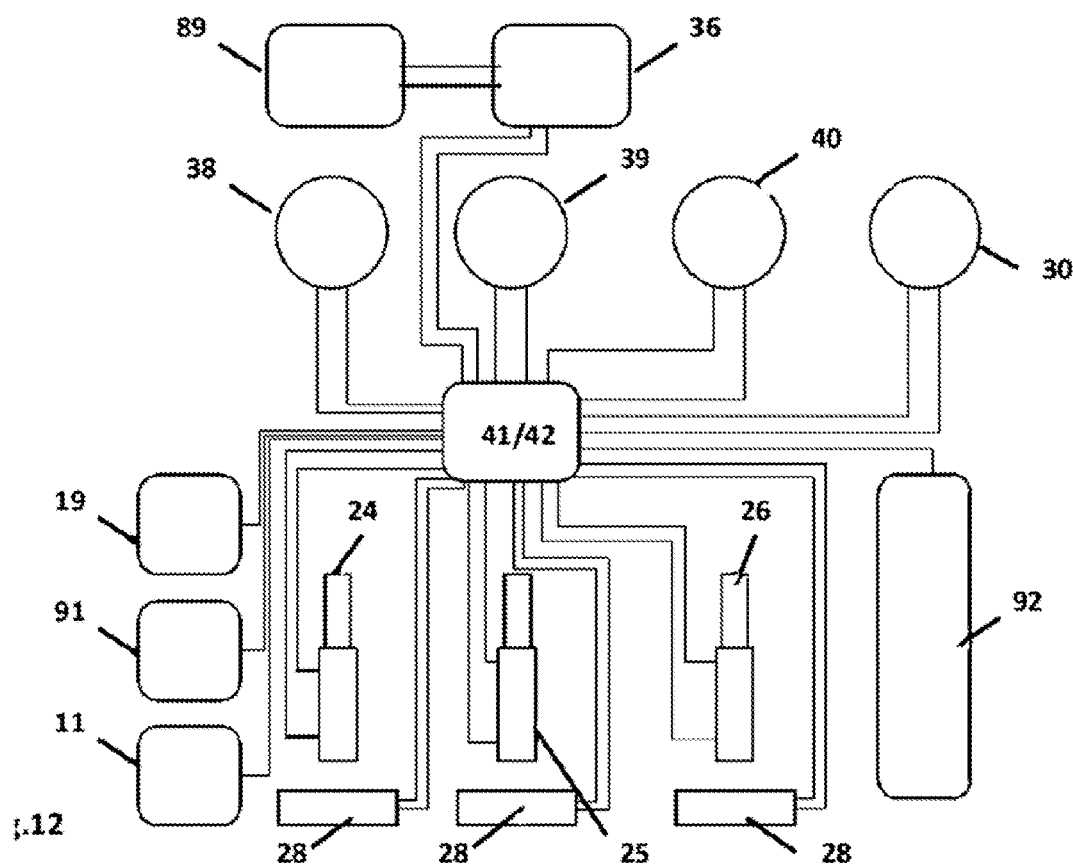
FIG. 12 illustrates a functional block diagram of the apparatus for harnessing wave energy, wind energy and solar energy according to an embodiment herein.

FIG. 5a illustrates side view of the floating flap 6, linkage units 12 and base portion 13 according to an embodiment of the present disclosure, while FIG. 5b illustrates front view of the floating flap 6 and base portion 13 according to an embodiment of the present disclosure. FIG. 5c illustrates a detailed view of encircled portion as shown in FIG. 5a according to an embodiment of the present disclosure. With respect to FIG. 5c, the base portion 13 has two or more fixed pivotal frames 20. The pivotal frame 20 is attached to a shaft 79 connected to the base portion 13. The shaft 79 rotates within the pivotal frame 20 for providing a fixed leaning point for a power extraction means 26 (as shown in FIG. 12). The shaft 79 is fixed to the pivotal frame 20 by welding or using a half-shaft. The power extraction means is adapted to be a reference portion for all the directional of movements of flap. All the high and low pressure reservoirs and control and monitor units are installed on the shore or deck and connected to the power houses through the power extraction means.

FIG. 5d illustrates a detailed view of rectangular portion as shown in FIG. 5b according to an embodiment of the present disclosure. With respect to the FIG. 5d, the base portion 13 is stable for installation in deep water. A pivot 21 is provided for restricting a movement of the base portion 12 in left or right direction. The pivot 29 helps in a movement of the floating flap 6 in left and right direction. A sliding rail 18 is provided for a linear motion with respect to pivoted rail 23. The pivoted rail, having a pivotal connection with said basic linkage unit in bottom and a railed connection with sliding rail of flap, permits the flap to oscillate in perpendicular to the oscillatory movement of the basic linkage unit so that the rail permits the flap to oscillate perpendicularly and obliquely to the base portion.

FIG. 6a illustrates a back view of the power extraction means and linkage units according to an embodiment of the present disclosure. With respect to FIG. 6a, a T-shaped part 21 is fixed to the base portion 13. The linkage unit 12 moves in forward and backward direction through the pivot of the T shaped part 21. A cylinder shaped ram 26 is pivoted to one end of T shaped part 21 and an adjustment and movement controller 28 is pivoted to another end of the T shaped part 21.

The floating flap is feasible to move in a forward motion and in backward motion to move the linkage unit 12. Further a cylinder ram 26 resists and converts the energy extracted by the floating flap to a pressured fluid energy. A pivoted rail 23 transfers the backward-forward motion of the floating flap to frame structure of basic unit 12. The pivot 29 (as shown in FIG. 6b) allows the pivoted rail 23 to move in the left and right direction. One end of the cylinder ram 24 is fixed to one end of the basic linkage unit 12 and other end of the cylinder ram 24 is fixed with the adjusting and movement controller device 28. The adjusting and the movement controller device 28 is in turn fixed to the pivoted rail 23. Thr cylinder ram 24 helps in converting energy extracted by the floating flap in right or left direction. The floating flap 6 has a vertical motion with respect to the pivoted rail 23. The heave motion of the floating flap 6 is transferred to cylinder ram 25 by the levers 16 and 17. The lever 16 has pivotal motion through pivot 34. The lever 17 rotates through pivot 32. One end of the cylinder ram 25 is connected to lever 17 and other end of the cylinder ram 25 is connected to the adjusting and movement controller 28 fixed with pivotal rail 23. The pivots 33, 27, 35 allow the cylinder rams 24, 26, 25 to rotate freely within the pivots 33, 27, 35 respectively.

FIG. 6b illustrates detailed view of the encircled portion 93 as shown in FIG. 6a according to an embodiment of the present disclosure. With respect to FIG. 6b, the pivot 29 has a fixed connection with a pivotal rail 23 and has a pivotal motion with basic linkage unit 12.

Figure 6C:
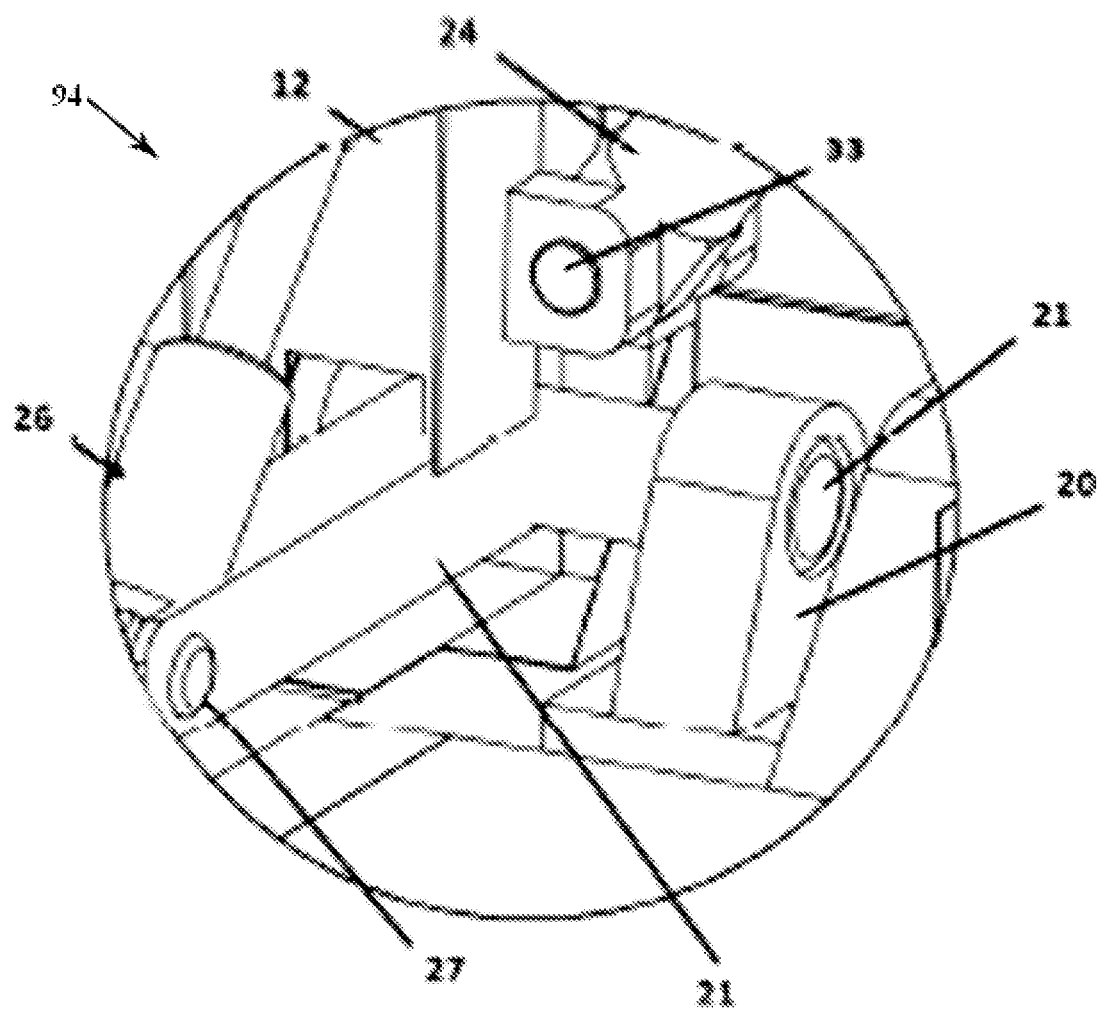
FIG. 6c illustrates an enlarged view of encircled portion marked 94 in FIG. 6a according to an embodiment of the present disclosure.

FIG. 6c illustrates a detailed view of the encircled portion 94 as shown in FIG. 6a according to an embodiment of the present disclosure. With respect to FIG. 6c, the T-shaped part 21 transfers a reaction force of the base portion 13 to cylinder ram 26.

FIG. 7 illustrates a cut away view of a basic linkage unit according to an embodiment of the present disclosure. With respect to the FIG. 7, each power extraction means has its own high pressure reservoirs 38, 39, 40. A high pressure fluid is passed to the reservoirs 38, 39, 40 and further moved into a control and distribution unit 41. A computer control unit 42 processes a data of the entire apparatus and controls the incoming force so that it is passed onto a hydro motor 36 or hydro motor 37.

Figure 8:
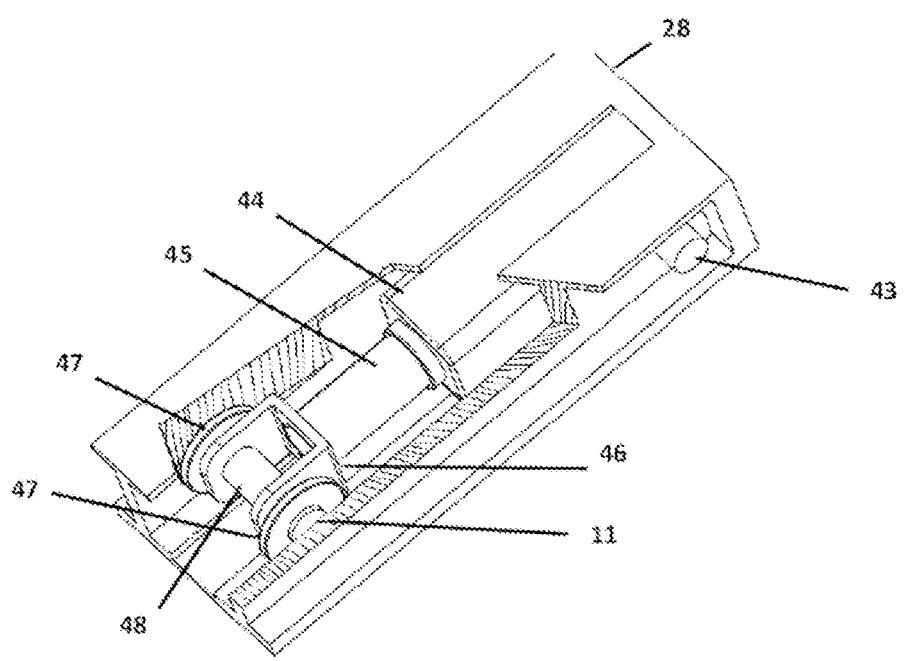
FIG. 8 illustrates a sectional view of the adjusting and movement controller device in an apparatus for harnessing wave energy, wind energy and solar energy according to an embodiment herein.

FIG. 8 illustrates a sectional view of the adjusting and movement controller device 28 according to an embodiment of the present disclosure. With respect to FIG. 8, the adjusting and movement controller device 28 is provided with two leading rails. A toothed shell box 44 is pivoted on the rails associated with the adjusting and movement controller device 28 through pivot 4. The toothed shell box 44 has a small pivotal mechanism to shift tangency of wheels 47 with upper or lower surface consecutively based on the direction of force of the prevailing waves. A shaft 48 forms a connecting point of the adjusting and movement controller device 28 and a cylinder ram 48 to helps in producing a pressurized fluid. After the production of the pressurized fluid, the shaft 45 gets locked inside the toothed shell box 44 and the lock is released by a computer control unit 42 to fix the shaft to other point.

Figure 9A:
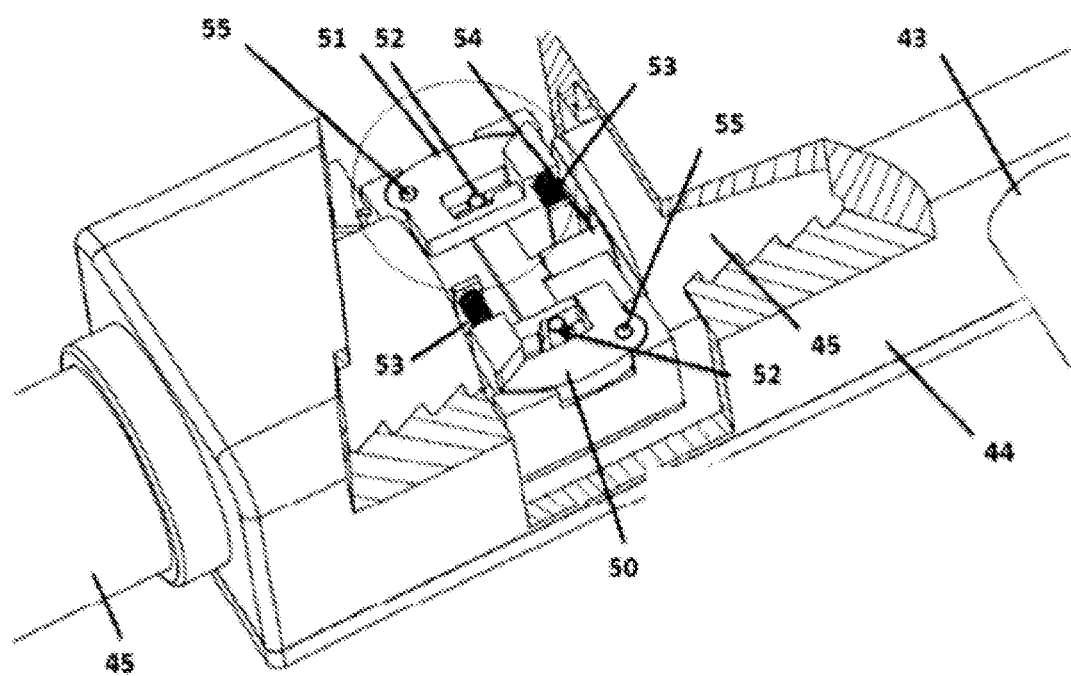
FIG. 9a illustrates a sectional view of the toothed shell in an apparatus for harnessing wave energy, wind energy and solar energy according to an embodiment herein.

FIG. 9a illustrates a sectional view of the toothed shell according to an embodiment of the present disclosure. With respect to the FIG. 9a, the toothed shell 44 has two linear teeth in the shape of ratchet. Each of the two linear teeth lines allows shaft 45 and its ratchet lockers 50, 51 to be free in one direction. The springs 53 helps in performing jobs of the ratchets 50, 51 and move the ratchets 50, 51 into the linear teeth. The commander cylinder ram 54 controls the activity and function of ratchets 50 and 51 through pulleys 52. The cylinder ram 54 implements four commands positioning in four points. In front end of the motion of the cylinder ram 54, the pulley 52 releases the ratchet locker 50 and has no effect on the ratchet locker 51. After moving one step back, the pulley 52 releases both the ratchet lockers 50, 51 and in the next to the step, the pulley 52 releases the ratchet locker 51 and has no effect on the ratchet locker 50. Further at the back end of the motion the cylinder ram 54, the pulley 52 releases both the ratchet lockers 50 and 51.

Figure 9B:
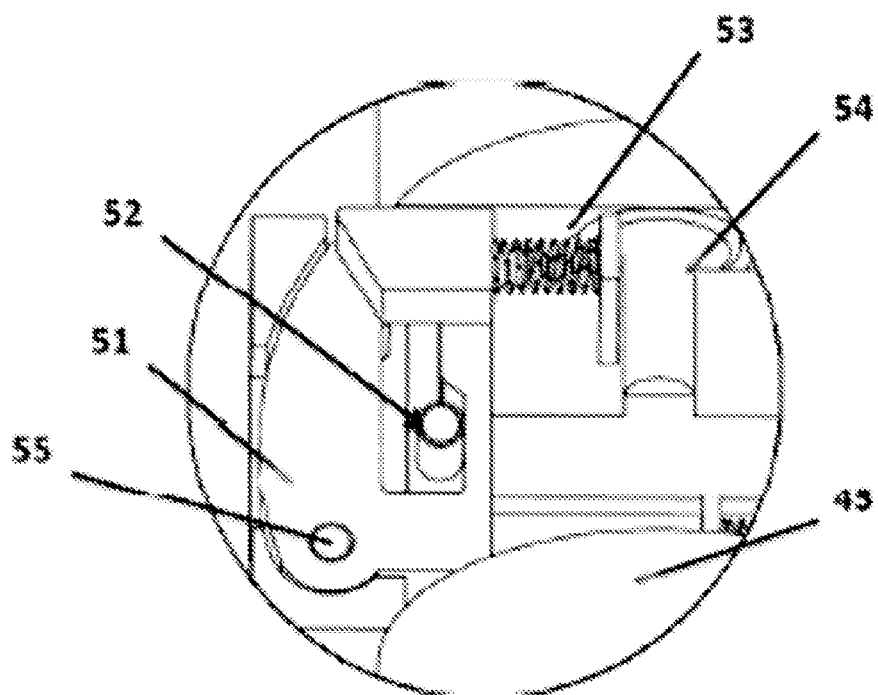
FIG. 9b illustrates an enlarged view of encircled portion as shown in FIG. 9a according to an embodiment of the present disclosure.

FIG. 9b illustrates a detailed view of the encircled portion as shown in FIG. 9a according to an embodiment of the present disclosure. The FIG. 9b illustrates the working of ratchets 50, 51. The pulleys motivate the lockers 50, 51 from passing through the outgrowths in the cut region of lockers or at the pushing end of the cut region and moving it as a lever.

Figure 10A:
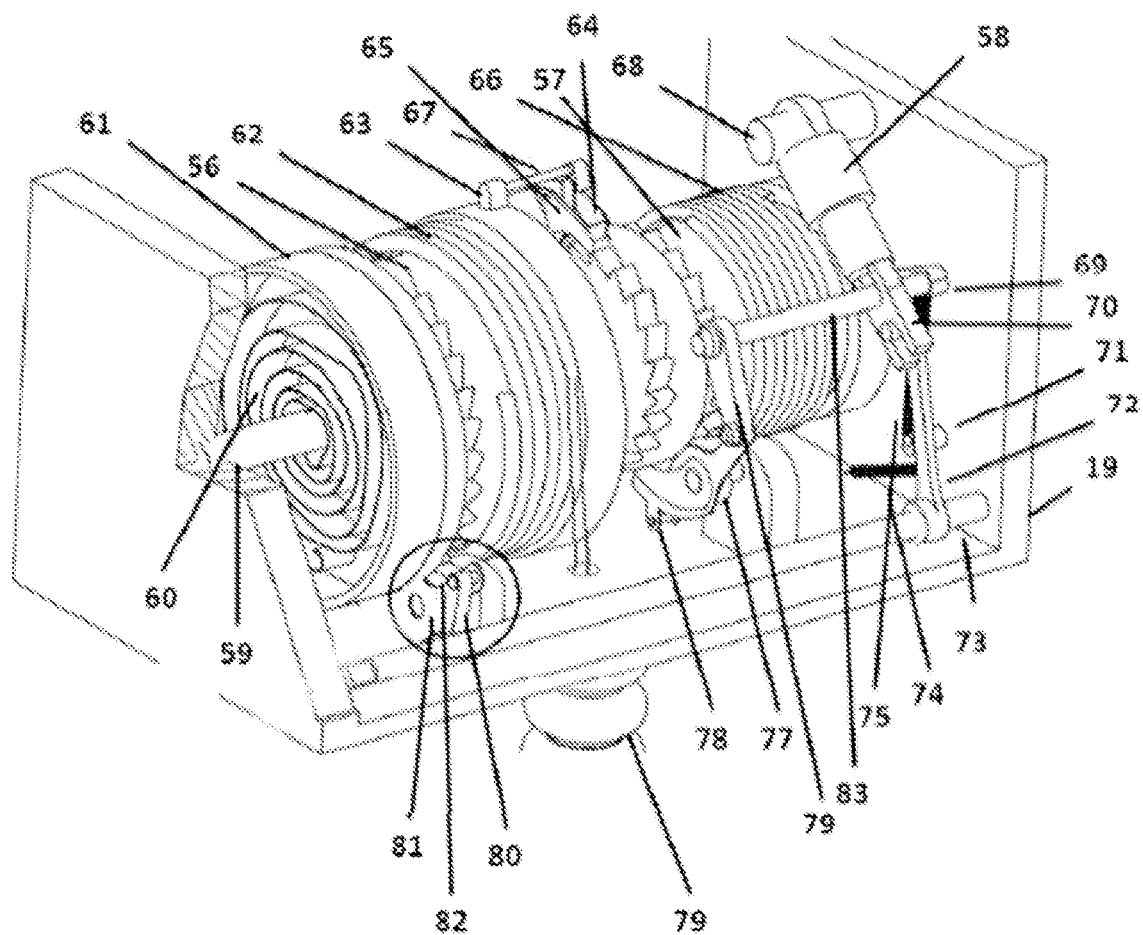
FIG. 10a illustrates a sectional view of the components in an elevator box in an apparatus for harnessing wave energy, wind energy and solar energy according to an embodiment herein.

FIG. 10a illustrates a sectional view of the components in an elevator box according to an embodiment of the present disclosure. The FIG. 10a includes a rope 62, preferably a steel rope wound on a pulley 56. The steel rope 62 is connected to a pivotal rail 23 (as shown in FIG. 5d). During the movement of the floating flaps, the flap pulls the steel rope 62 and the steel rope 62 rotates the pulley 56 and charges spring 60. The circular motion of the pulley 56 is further transferred to the pulley 57 through a locker 65. A rope 66 is wound over the pulley 57 to pull the elevator mass 14 (as shown in FIG. 2b) in an upward direction. The motion of rope 62 is short depending on the flap motion whereas the pulley 57 elevates the mass 14 to a longer distance. The pulley 56 is provided with one ratchet and a locker 82 is constrained within an elevator box 19. The pulley 57 is provided with two ratchets and locker 65, 82, 77.

Figure 11:
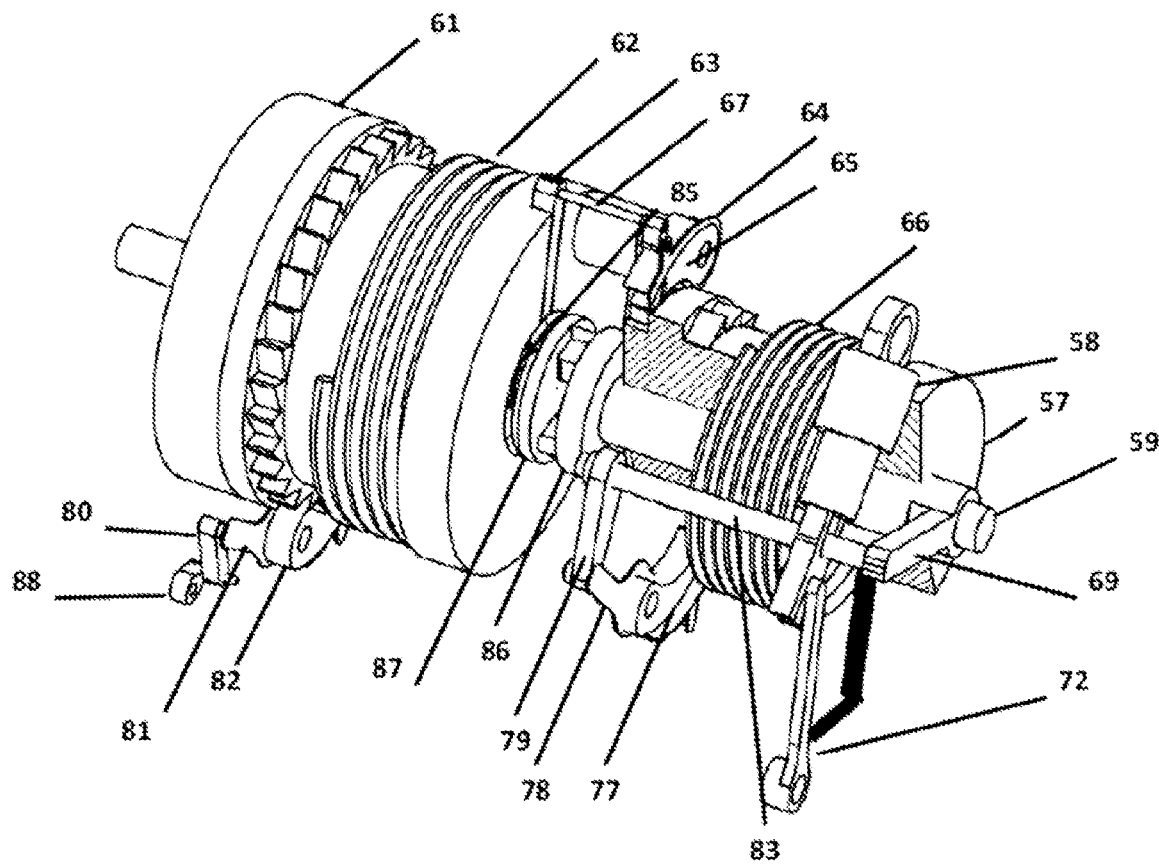
FIG. 11 illustrates a perspective view of the mechanical parts in the elevator box in an apparatus for harnessing wave energy, wind energy and solar energy according to an embodiment herein.

During the free position of the locker 82, the spring 60 gets charged and the floating flap makes the locker 82 free. Subsequently the locker 77 locks the pulley 57 to keep the elevator mass 14 in its position. Further, during the locking of the pulley 56 by the locker 82, the spring remains uncharged and the rope 62 stays within the flexible object 79. When locker 77 and locker 65 are released, the pulley 57 is also released and mass 14 is moved to the lower position. A cylinder ram 58 commands all lockers 77, 65, 82 through the forward and backward motions of the cylinder ram 58. The elevator box includes an H shaped part 70 to control the operation of the cylinder ram 58 in regulating the operation of several lockers The cylinder ram 58 moves the handles 72, 88 (as shown in FIG. 11), 80,81 and rotates shaft 73 to release locker 82 in a forward motion. Further, the cylinder ram 58 moves the shaft 83, the handles 69, 79 and the lever 78 to release the ratchets 65, 77.

Figure 10B:
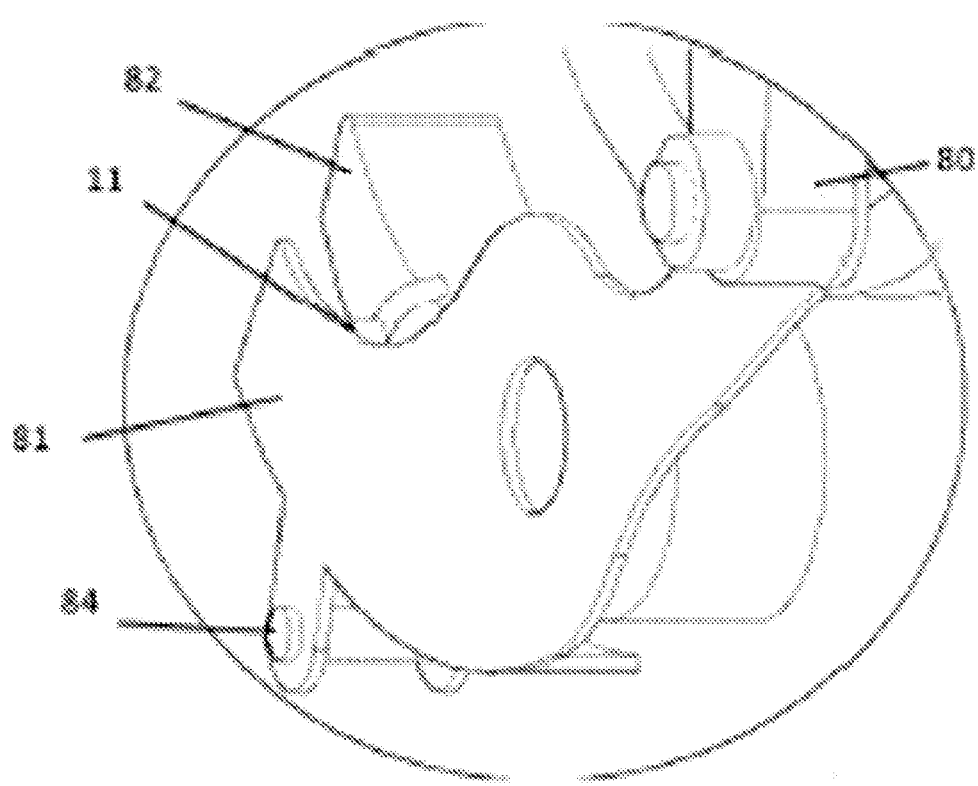
FIG. 10b illustrates an enlarged view of encircled portion as shown in FIG. 10a according to an embodiment herein.

FIG. 10b illustrates detailed view of the encircled portion as shown in FIG. 10a according to an embodiment herein to describe the working and releasing of lockers arranged in the shape of ratchets. The locker 82 locks the linear teeth which is in the shape of the ratchet in one direction and allows the linear teeth to rotate in other direction. A spring (not shown) keeps the linear teeth in its position. The lever 81 is pulled by the lever 80. Further a pin 11 is moved along its slot in the lever 82 and pulls the lever 82 at the end of the slot such that the lever 82 is free to slide on gears without hitting the lever 81.

FIG. 11 illustrates a sectional view of the command mechanism of an elevator box 19 according to an embodiment of the present disclosure. With respect to FIG. 11, a slider 63 releases lever 65 through the shaft 67 and the lever 64. The slider 63 is provided in a chisel shape with an angle of 45 degree near the centre of pulley 56 in a manner that the left motion of part 87 slides the slider 63 away from the centre. A spring 85 pushes the slider 63 back when the slider 63 is at free position. The part 87 has two or more projections with oblique surface. A part 86 helps in sliding the slider 63 when the part 87 rotates in a clockwise direction and makes the slider 63 free when the part 87 rotates in an anticlockwise direction. The part 86 is provided with a shaft 59 which passes through the pulley 57. Further the shaft 59 has a handle 69. The cylinder ram 58 (as shown in FIG. 10a) pulls the handle in a backward motion and releases it in a forward motion. Subsequently, the lockers 77, 65 are released and locked simultaneously to ensure that the downward motion of the mass 14 doesn't rotate the pulley 56.

FIG. 12 illustrates a functional block diagram in the apparatus for harnessing a wave energy, wind energy and solar energy according to an embodiment of the present disclosure. With respect to FIG. 12, a computer command system 42 and control system 41 form the central brain of the apparatus. A sensor 92 sends a data to the command system 42. The command system 42 performs the execution of commands associated with the apparatus through the control system 41. One or more sensors are installed within the control system 41. The power extraction means 24, 25, 26, an adjustment and movement controller 28, all reservoirs 30, 38, 39, 40 and hydro motors are connected to the control system 41. An Elevator box 19, a gear box 11 and a controllable valve 91 also are connected with the control system 41 to implement the commands.

Although the embodiments herein are described with various specific embodiments, it will be obvious for a person skilled in the art to practice the invention with modifications. However, all such modifications are deemed to be within the scope of the claims.

It is also to be understood that the following claims are intended to cover all of the generic and specific features of the embodiments described herein and all the statements of the scope of the embodiments which as a matter of language might be said to fall there between.

What is claimed is:

1. An apparatus for harnessing wave energy, solar energy and wind energy, the apparatus comprising:
    a floating frame;
    a base portion connected to the floating frame;
    at least two linkage units, wherein the two linkage units are a basic linkage unit and a medium linkage unit;
    a plurality of floating flaps;
    a connecting pivot provided in the linkage units and the base portion;
    at least one power extraction means; and
    at least three wind turbine towers provided in the floating frame to extract the wind energy, said at least three wind turbine towers forming a base of a roofing for installing a plurality of photovoltaic sheets to extract the solar energy;
    wherein the floating flaps are pivoted vertically on the basic linkage unit and the base portion and wherein the floating flaps have a plurality of secondary flaps and a plurality of floats and wherein the plurality of secondary flaps are placed under water against prevailing waves and wherein the plurality of floats are placed on a surface of water for absorbing a wave energy from a plurality of projected portions that are present at edges and middle portion of the secondary flaps.

2. The apparatus of claim 1, wherein the floating frame is tethered to a seabed for preventing astray of the floating frame from the seabed.

3. The apparatus of claim 1, wherein the at least three wind turbine towers are built away from the roofing to decrease a shadowing effect on the plurality of photovoltaic sheets.

4. The apparatus of claim 1, further comprising:
    a plurality of cavities filled with light material and provided in the plurality of floating flaps;
    a built in float connected to each of the flap, wherein the built in float is connected at top of the flap along horizontal and width of the flap to keep floating on surface of the water and move vertically during wave motions;
    one or more elevator boxes; and
    at least one gear box provided in each of the elevator box for pulling up a mass body or releasing down the elevated mass body to a lower position to release a potential energy of the elevated mass body.

5. The apparatus of claim 4, wherein each of the elevator box comprises at least two pulleys and at least two ropes; and wherein at least one of the rope and at least one of the pulley is adapted to convert a pulling force of the flap to a circular motion and to receive the pulling force to elevate a body mass.

6. The apparatus of claim 1, wherein each of the floating flaps comprises a sealed linkage unit and wherein the sealed linkage unit comprises a power extraction means, a plurality of high pressure reservoirs, a plurality of low pressure reservoirs, at least one command system, a plurality of control systems, a plurality of hydromotors and a plurality of generators adapted for movement of each of the floating flaps in at least one of a left direction, a right direction, a backward direction, a forward direction and a heave direction.

7. The apparatus of claim 1, wherein the basic linkage unit is pivoted on the base portion to permit the floating flaps to oscillate in one or more of the forward direction, the backward direction, the left direction, the right direction and the heave direction.

8. The apparatus of claim 1, wherein the basic linkage unit and the base portion are connected by a pivot provided with a fixed element and wherein the fixed element is provided in perpendicular to an axis of the pivot.

9. The apparatus of claim 1, wherein each of the floating flaps further comprises at least one sliding rail and an flexible object; and wherein the at least one sliding rail is connected to a bottom portion or a middle portion of the floating flap to permit the floating flap to slide in the pivoted rail in a vertical direction and oblique direction; and wherein the flexible object is provided along each of the sliding rail and the pivoted rail to avoid touching edge of the sliding rail and the pivoted rail sinking into the water.

10. An apparatus as claimed in claim 1, further comprising:
a connecting means for connecting the basic linkage unit to a space out of the water;
a pivoted rail;
a lever pivoted on the pivoted rail; and
a connecting lever pivoted on the sliding rail for shifting a vertical motion of the flap to a pivotal motion, wherein the connecting lever is connected to the bottom portion of the flap;
wherein the basic linkage unit is pivoted on a pivoted rail along with the flap to permit each of the flap to move in the direction perpendicular to a pivotal motion of the basic linkage unit and the pivot associated with the pivoted rail is placed within the basic linkage unit to avoid sinking of the floating flap into the water.

11. The apparatus of claim 1, wherein the at least one power extraction means is arranged between an axis of the basic linkage unit and a body of the basic linkage unit for extracting wave energy from a motion of the flap.

12. The apparatus of claim 1, wherein the at least one power extraction means is arranged between the pivoted rail and the body of the basic linkage unit for extracting wave energy from a motion of the flap.

13. The apparatus of claim 1, wherein the at least one power extraction means is arranged between the pivoted rail and the pivoted lever of the heave motion to extract wave energy from a motion of the flap.

14. The apparatus of claim 1, wherein each of the power extraction means further comprising:
at least one hydraulic ram for converting mechanical energy of the wave to a pressurized fluid energy;
one or more hydro motors for converting the pressurized fluid energy into a circular mechanical motion;
one or more generators for converting the circular motion of the hydro motors to generate electrical power; and
an adjustment and movement controller device provided in each of the hydraulic ram for facilitating one end of the hydraulic cylinder ram to attain a locked position or a free position or to change a displacement length of the hydraulic cylinder ram to a predefined angular change.

15. The apparatus of claim 14, wherein the adjusting and movement controller device further comprises double rails and at least one adjusting unit and wherein the at least one adjusting unit comprises a shaft, at least two free wheels, a double toothed shell, at least two ratchet locker and a pneumatic cylinder ram and wherein the shaft gets locked within the double toothed shell for fixing one end of the power extracting means.

16. The apparatus of claim 15, wherein the shaft gets locked within the double toothed shell utilizing the at least two ratchet locker such that each of the two ratchet locker locks the shaft in at least one direction.

17. The apparatus of claim 1 further comprising:
a plurality of low pressure reservoirs for retaining the fluid;
a feed extraction means;
at least three high pressure reservoirs for reserving at least one of the wave energy, solar energy and wind energy;
a plurality of sensors;
a plurality of micro switches;
an electronic command and monitoring unit connected to the plurality of sensors;
and wherein the plurality of micro switches are used for monitoring data associated with a status of the apparatus.

18. The apparatus of claim 1, wherein the linkage unit comprising:
a control unit;
a plurality of valves provided in the control unit; and
a plurality of distribution devices.

* * * * *